United States Patent [19]

Mullins

[11] Patent Number: 4,890,540

[45] Date of Patent: Jan. 2, 1990

[54] BREATHER HOLES AND PLUG MEMBER FOR A SERVICE/EMERGENCY BRAKE ACTUATOR

[75] Inventor: Tommy D. Mullins, Murfreesboro, Tenn.

[73] Assignee: Nuturn Corporation, Nashville, Tenn.

[21] Appl. No.: 279,792

[22] Filed: Dec. 5, 1988

[51] Int. Cl.[4] .................................................. F01B 7/00
[52] U.S. Cl. ..................................... 92/63; 92/130 R; 92/130 A
[58] Field of Search ............. 92/62, 63, 80, 86, 130 R, 92/130 A, 163, 164; 91/437, 268, 442

[56] References Cited

U.S. PATENT DOCUMENTS

| | | |
|---|---|---|
| 3,101,219 | 8/1963 | Herrera ..................................... 92/63 |
| 3,200,717 | 8/1965 | Einsiedler ............................... 92/163 |
| 3,372,623 | 3/1968 | Wearden et al. ................... 92/130 A |
| 3,625,117 | 12/1971 | Tazelaar ............................ 92/130 A |
| 3,712,181 | 1/1973 | Swander, Jr. et al. ............ 92/130 A |
| 3,796,138 | 3/1974 | Doyle et al. ............................. 92/63 |
| 3,926,094 | 12/1975 | Kurichh et al. ......................... 92/63 |
| 4,508,018 | 4/1985 | Choinski et al. ...................... 92/128 |

Primary Examiner—Robert E. Garrett
Assistant Examiner—Thomas Denion
Attorney, Agent, or Firm—Cushman, Darby & Cushman

[57] ABSTRACT

Service/emergency brake actuator mechanism for use with the air brake system of a wheeled vehicle. A plurality of breather holes or openings are provided in the housing section of the emergency brake actuator chamber that houses the emergency actuator spring to maintain the chamber at atmospheric pressure. The openings are arranged such that regardless of the orientation of the brake actuator mounted in the wheeled vehicle, one of those openings will be located in the upper hemisphere of the chamber housing and another opening will be located in the lower hemisphere of the chamber housing. A flow resistant plug member, adapted to fit into any of the openings, is provided to seal whichever opening is oriented in the upper hemisphere of the chamber housing. This arrangement minimizes the amount of dust and dirt particles that enter the chamber and, thus, keeps the chamber free of contamination that could hinder actuator performance.

6 Claims, 3 Drawing Sheets

BREATHER HOLES AND PLUG MEMBER FOR A SERVICE/EMERGENCY BRAKE ACTUATOR

FIELD OF THE INVENTION

This invention relates to a service/emergency brake actuator assembly, for use with air brake systems, that can be mounted in a wheeled vehicle.

BACKGROUND OF THE INVENTION

Spring-type brake actuators are commonly used with air brake systems on wheeled vehicles such as trucks. A typical brake actuator, such as that illustrated in U.S. Pat. No. 3,796,138, issued Mar. 12, 1974, includes two separate actuator components, a service brake actuator assembly and an emergency brake actuator assembly.

The service brake actuator assembly applies the brakes of the vehicle through a push rod in response to air pressure delivered against a flexible diaphragm of the service actuator during the normal course of driving. In the emergency brake actuator assembly, a powerful compression spring in one portion of the emergency actuator chamber stores sufficient energy to apply the brakes. Air pressure in another portion of the emergency actuator chamber acts on another flexible diaphragm to compress the emergency actuator spring and maintain it in its brake-released position. When the air pressure is exhausted from the chamber, either under the control of the vehicle operator or due to the failure of the brake air system, the emergency actuator spring acts on the diaphragm and another push rod to actuate the service brake assembly and apply the brakes.

In the instant invention, it is desirable to maintain the emergency actuator spring chamber at atmospheric pressure so that the emergency diaphragm is met with minimum resistance as it moves into its brake-releasing position. This is accomplished by providing breather holes or openings in the spring chamber housing so that the chamber communicates directly with the outside air environment.

The use of such breather holes are known in the art. However, breather holes in a typical brake actuator create problems when the actuator is employed in an air environment of a wheeled vehicle that is commonly contaminated with dust, dirt, and other foreign matter. Each time the emergency brake actuator is engaged, contaminant-laden air is drawn into the emergency spring chamber through the breather holes. In addition, even when the emergency actuator is not being operated, foreign matter floating in the air may settle and enter the spring chamber through the breather holes, primarily those located in the upper portion of the spring chamber housing.

Depending upon the orientation of the actuator, the dust and dirt particles that enter the spring chamber will tend to settle under the force of gravity to the lowermost portion of the chamber, thus, leaving foreign matter to collect in the chamber. This accumulation of contaminants interferes with moving parts and, thus, hinders the performance of the brake actuator and shortens its useful life.

SUMMARY OF THE INVENTION

An object of the present invention is to provide a service/emergency brake actuator for actuating a brake system of a wheeled vehicle in an air environment containing contaminants such as dust, dirt, or the like, that minimizes the amount of contaminants that collect inside the emergency brake actuator chamber. In the preferred embodiment, this is accomplished by providing the brake actuator with a rigid housing structure having a longitudinal axis with an upper and a lower hemisphere defined, respectively, above and below the axis. The housing structure has an emergency diaphragm and service diaphragm mounted therein which move independently between a brake-applying position and a brake-releasing position.

The emergency diaphragm defines with the housing structure a variable volume spring chamber and a variable volume air chamber on opposite sides of the emergency diaphragm. A compression spring is provided in the spring chamber to resiliently bias the emergency diaphragm into its brake-applying position wherein the spring chamber will have a maximum volume and the air chamber will have a minimum volume. The emergency air chamber is operable to receive air under sufficient pressure to move the emergency diaphragm from its brake-applying position into its brake-releasing position wherein the emergency spring will be compressed, and the spring chamber will have a minimum volume and the air chamber will have a maximum volume.

The service diaphragm defines with the housing structure a variable volume control chamber on one side of the service diaphragm. The control chamber is operable to receive air under sufficient pressure to move the service diaphragm from its brake-releasing position into its brake-applying position, and to have the pressurized air discharged therefrom to allow the service diaphragm to move from its brake-applying position into its brake-releasing position.

The brake actuator is further provided with a brake-applying means movable in response to the introduction and discharge of air under pressure into and out of the service control chamber and the resultant movements of the service diaphragm when the emergency air chamber is filled with pressurized air and the emergency diaphragm is retained thereby in its brake-releasing position. The brake-applying means is further movable in response to the movement of the emergency diaphragm under the bias of the emergency spring into its brake-applying position when air pressure is discharged from both the emergency air chamber and the service control chamber.

Mounting means are attached to the housing structure for orienting the actuator in the wheeled vehicle in more than one position. A plurality of air flow openings extend through the housing structure that defines the variable volume spring chamber for maintaining the spring chamber at atmospheric pressure. The openings are arranged such that, regardless of how the brake actuator is oriented, at least one of the openings will be located in the upper hemisphere of the spring chamber housing and another of the openings will be located in the lower hemisphere of the spring chamber housing.

A flow restrictive plug, made from a flexible material such as rubber, is adapted to be inserted into any of the air flow openings so that regardless of how the actuator is oriented in the wheeled vehicle, the opening arranged in the upper hemisphere of the spring chamber housing can be plugged to minimize the likelihood that the contaminants will enter the spring chamber. Ideally, the openings are diametrically opposed and located in the uppermost and lowermost hemispheric portions of the spring chamber housing. The openings are further located at an axially intermediate portion of the spring chamber housing.

This arrangement keeps the chamber cleaner and, thus, improves the performance and extends the working life of the actuator. That and other objects and advantages of the instant invention will become more apparent from the following disclosure of the invention and the appended claims.

BRIEF DESCRIPTION OF THE DRAWINGS

The instant invention may best be understood with reference to the accompanying drawings wherein.

DETAILED DESCRIPTION OF THE INVENTION

Figure 1:
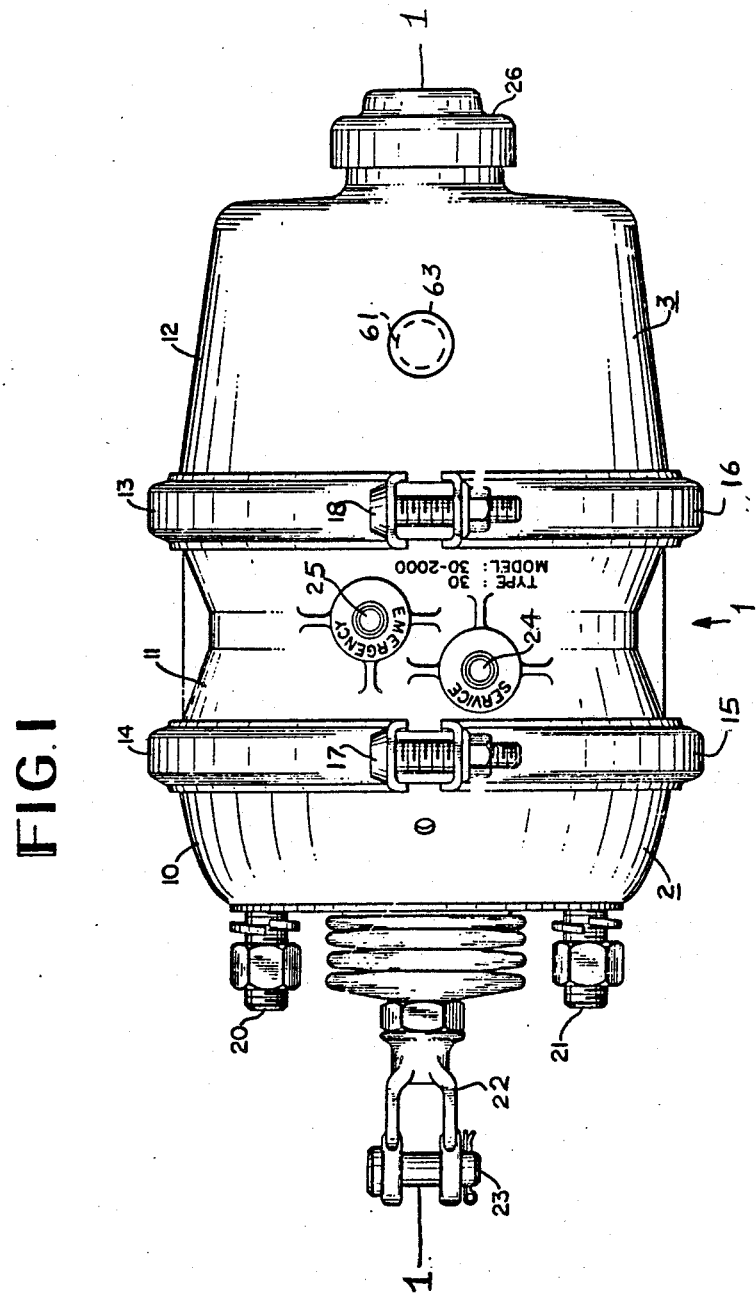
FIG. 1 is a perspective top view of the brake actuator according to the instant invention.

As shown in FIG. 1, the brake actuator of the instant invention is formed by an annular housing structure, generally designated 1, having a longitudinal axis, which is divided into two main sections for housing a service brake actuator assembly 2 and an emergency brake actuator assembly 3. Housing 1 includes a cup-shaped housing section 10, an intermediate annular housing section 11 attached at one end to housing section 10, and a rear cup-shaped housing section 12 attached to the other end of housing section 11. Circumferential clamp bands 13, 14, 15, and 16, secured by bolts 17 and 18, hold housing sections 10, 11 and 12 together to form housing 1.

Figure 2:
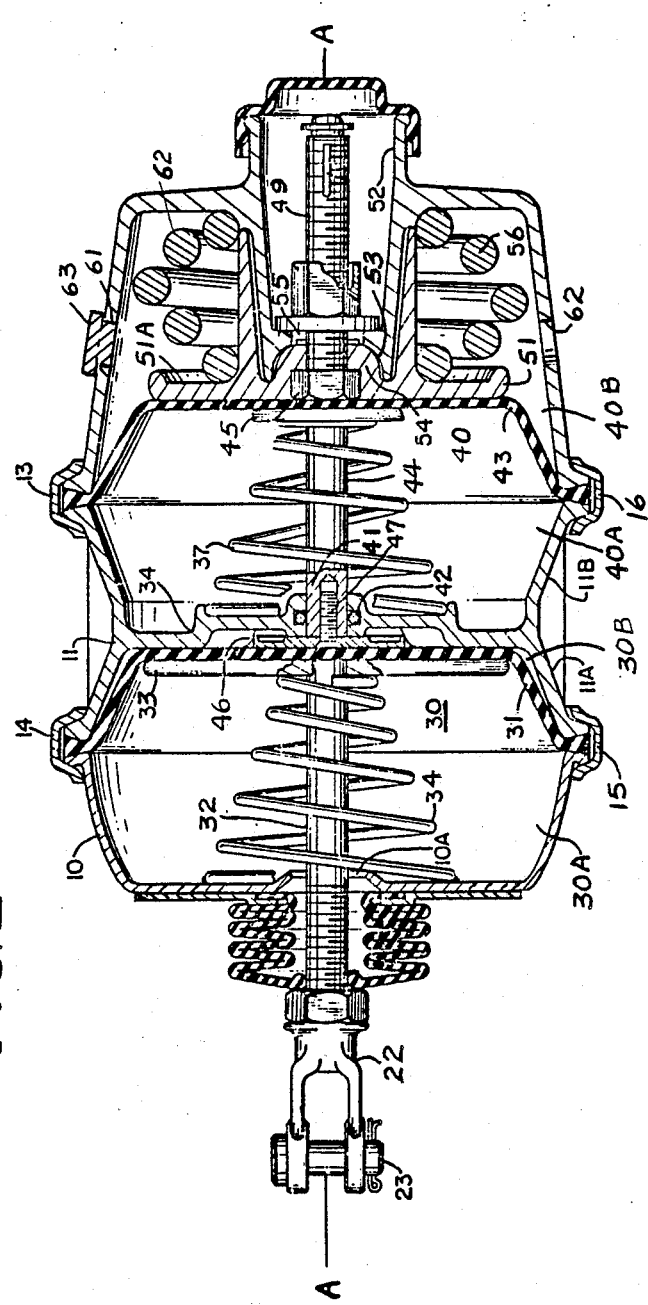
FIG. 2 is a longitudinal, cross-sectional view of the brake actuator of the instant invention taken along the line 1—1 of FIG. 1, showing the emergency brake actuator in its inoperative or brake-released position.

Referring now to FIG. 2, a circular dividing wall 19 extending from intermediate housing section 11, along with housing section 10 and annular portion 11A of housing section 11, form a service brake chamber 30 which houses the service brake actuator 2. Dividing wall 19 also defines an emergency brake chamber 40, along with housing section 12 and annular portion 11B of housing section 11, for housing the emergency brake actuator 3.

A heavy-duty neoprene diaphragm 31 is provided inside service chamber 30 dividing it into two variable volume portions 30A and 30B. Circumferential clamp bands 14 and 15 secured by bolt 17, clamp the peripheral edges of the diaphragm between the radially extending flanged ends of housing sections 10 and 11A.

An axially extending service push rod segment 32 is slidably supported in housing section 10 and has an annular piston plate 33 secured to one end thereof. A conical compression spring 34 surrounding push rod 32 has a larger diameter end seated against the end wall of housing section 10, and a smaller diameter end bearing against a face of piston plate 33 for holding the plate against flexible service diaphragm 31.

Figure 3:
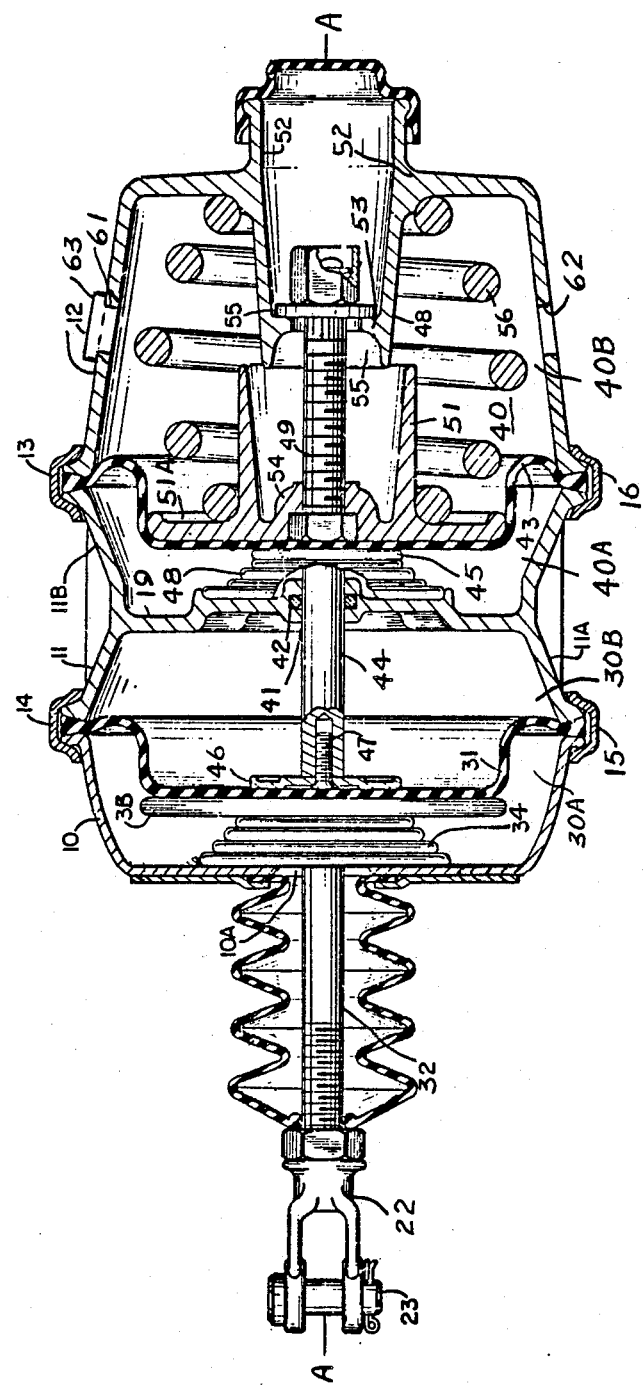
FIG. 3 is a longitudinal, cross-sectional view of the brake actuator of the instant invention, taken along the line 1—1 of FIG. 1, showing the emergency brake actuator in its operative or brake-applied position.

FIG. 1 shows air supply ports 24 and 25 formed in housing section 11, which communicate with the housing chambers 30 and 40, enabling the actuator to be pneumatically operated by pressurized air. The conical compression spring 34 normally biases piston plate 33 and service diaphragm 31 in the position illustrated in FIG. 2 so that service push rod segment 32 is retracted and the brakes of the vehicle are released. When the service brake is operated, air supply port 24 directs pressurized air into control chamber 30B, forcing diaphragm 31 into its brake-applying position and extending service push rod segment 32 through an opening 10A in housing section 10 as shown in FIG. 3.

Push rod 32 is threadably connected at its forward end to a clevis yoke 22 which is pivoted at a clevis pin 23 to a conventional brake arm slack adjuster (not shown). Displacement of rod 32 displaces clevis pin 23 and, consequently, rocks a brake arm slack adjuster in a manner well understood by those skilled in the art.

Chamber 40 of the emergency brake actuator 3 is shown in FIG. 2 to the right of service chamber 30. Circular dividing wall 19 has a push rod opening 41 with a fluid-tight O-ring 42 that seals chamber 40. Another heavy-duty neoprene diaphragm 43 is arranged within the chamber. The peripheral edges of diaphragm 43 are clamped between the radially extending flanged ends of housing sections 11B and 12 by circumferential clamp bands 13 and 16 held together by bolt 18. Flexible emergency diaphragm 43 divides chamber 40 into a variable volume pressure chamber portion 40A and a variable volume atmospheric chamber portion 40B.

Supported in push rod opening 41 is a rigid, axially extending push rod segment 44 aligned with push rod segment 32 of the service actuator. A first removable pressure plate member 45 is provided at an intermediate portion of push rod segment 44. A second removable pressure plate member 46, located in service chamber portion 30B, is secured to an end of push rod segment 44 by means of a screw 47. Pressure plate member 46 engages but is not fixedly secured to the face of flexible diaphragm 31 to maintain push rod segments 32 and 44 in axial alignment. Thus, diaphragm 31 and push rod 32 of the service actuator are free to move between a brake-releasing and brake-applying position independently of diaphragm 43 and push rod segment 44 of the emergency actuator.

Push rod segment 44 is spring biased in a brake-released position by a conical compression spring 48 surrounding the push rod. The larger diameter end of the spring is seated in an annular groove 19A formed in circular dividing wall 19 and its smaller diameter end bears against a surface of pressure plate member 45.

Emergency actuator chamber 40A is adapted to receive pressurized air through the air-inlet port 25 shown in FIG. 1. Thus, it is apparent that by admitting pressurized air into pressure chamber 40A, the air pressure and force of compression spring 48 will urge flexible emergency diaphragm 43 into its brake-released position shown in FIG. 2.

The end wall of housing section 12 is provided with a conical guide member 52 tapered along its inner and outer surfaces. The guide member has a tapered recess 53 at one end for receiving a tapered boss 54 projecting from a spring piston plate 51 securely fixed to an extended threaded portion 49 of emergency push rod segment 44. Pressure plate 45 and piston plate 51 sandwich flexible emergency diaphragm 43 therebetween. Guide member 52 also has an axial opening 55 through which projects threaded portion 49 of push rod segment 44. Surrounding the radial outer surface of guide member 52, inside housing section 12, is a powerful, barrel-shaped compression spring 56, having one end bearing against an end wall of section 12 and its other end bearing against a recessed portion 51A of spring piston plate 51.

Threaded mounting bolts 20 and 21, shown in FIG. 1, fixedly attached to the end of housing section 10, rigidly secure the actuator to a mounting bracket (not shown) of a vehicle chassis. Typically, the mounting bracket is oriented in the vehicle in such a way that, when the mounting bolts 20 and 21 are secured thereto, the axis A—A of the actuator is angled up to forty-five degrees above or below a horizontal plane. For purposes of illustration only, the brake actuator of FIGS. 2 and 3 is shown in a horizontal position.

As shown in the embodiment of the various drawing figures, a pair of breather holes or openings 61 and 62 are provided in the annular wall of housing section 12 to maintain spring chamber 40B at atmospheric pressure. As shown in FIGS. 2 and 3, opening 61 is located in the upper hemisphere of housing section 12 above the axis A—A of the actuator, and opening 62 is located in the lower hemisphere of housing section 12 below the axis. It should be recognized, however, that the pressurized air lines in the vehicle which supply air to ports 24 and 25 may be located such that the ports must be oriented on the bottom of the brake actuator. That is achieved by rotating the actuator along its axis 180 degrees to reverse the positions of mounting bolts 20 and 21 as shown in FIG. 1. In such a case, openings 61 and 62 would then be located in the lower and upper hemispheres, respectively, of housing section 12. In the preferred embodiment, the breather holes also are diametrically opposed and located in the uppermost and lowermost portions of housing section 12 as shown in FIGS. 2 and 3. The openings are further positioned at an axially intermediate portion of housing section 12 to preserve the housing's structural integrity.

With reference now to both FIGS. 2 and 3, the operation of the service/emergency brake actuator will be described. Assuming that pressurized air is maintained in emergency brake actuator chamber 40A, compression spring 56 and flexible diaphragm 43 will remain in the brake-released position illustrated in FIG. 2. When the vehicle operator actuates the service brakes, pressurized air is supplied via supply port 24 into control chamber 30B of the service actuator. The air pressure forces service diaphragm 31 into its brake-applying position compressing spring 34. When the vehicle operator releases the service brake, the pressurized air is exhausted from chamber 30B whereby the force of spring 34 returns service diaphragm 31 to its brake-released position.

When the emergency brake is activated, either by the vehicle operator for parking purposes, or in the event that the pressurized air system fails, the air in chamber 40A will be exhausted and, consequently, the pressure in the chamber will decrease. This loss of pressure allows the stored force of compression spring 56 to urge spring piston plate 51, along with emergency diaphragm 43, into a brake-applying position. As shown in FIG. 3, this forces push rod 44 through opening 41 which in turn engages, through plate member 46, service diaphragm 31 and service push rod 32 to activate the brakes.

To release the brakes after they are set in this emergency condition, the vehicle operator supplies pressurized air through the air supply port 25 to repressurize chamber 40A. As the chamber pressure bearing against diaphragm 43 increases, it overcomes the compressive force of spring 56 and forces the spring back to the position shown in FIG. 2. Breather holes 61 and 62 maintain spring chamber 40B at atmospheric pressure to provide minimum resistance to the return of emergency diaphragm 43 when air chamber 40A is repressurized.

It will be seen that each time the emergency brake actuator 3 is activated into its brake-applying position, as shown in FIG. 3, the movement of diaphragm 43 increases the volume of chamber 40B to a maximum volume and, thus, will draw in the contaminated air that surrounds the vehicle through the breather holes. When the parking brake is released, air is reintroduced into chamber 40A forcing flexible emergency diaphragm 43 into the position illustrated in FIG. 2, and causing the volume of spring chamber 40B to decrease, thus exhausting the air from the chamber through the breather holes.

In the arrangement shown in FIGS. 2 and 3, it has been found that contaminants will be less likely to enter spring chamber 40B if all the air is forced to pass through the lowermost opening 62 in housing section 12 when the emergency brake is actuated. In addition, even when the emergency brake actuator is not in operation, free-floating particles in the air will also be less likely to settle under the force of gravity and enter chamber 40B through the lower opening 62 than the upper opening 61.

Therefore, the present invention contemplates minimizing the amount of contaminants entering the spring chamber by using a flow restrictive plug member 63, made of a suitable material such as rubber, to plug uppermost opening 61 so that any air and/or containments entering into the chamber must do so through lowermost opening 62. Conversely, should the brake actuator be mounted in the vehicle such that openings 61 and 62 are located, respectively, in the lower and upper hemispheres of housing section 12, then the upper opening 62 will be plugged and lower opening 61 will be left open to operate as the breather hole for the spring chamber.

With this arrangement, regardless of how the brake actuator is oriented in the wheel vehicle, the spring chamber is kept at atmospheric pressure while minimizing the amount of dust and dirt particles entering the chamber. This, in turn, will result in longer actuator life and better performance.

Although the preferred embodiment of the present invention has been described, it should be understood that various modifications and adaptations thereof may be made within the scope and spirit of the invention.

What is claimed is:

1. A pneumatic service/emergency brake actuator for actuating a brake system of a wheeled vehicle having an air environment containing contaminants such as dust, dirt, or the like, comprising:
   a rigid housing structure having a longitudinal axis with an upper and a lower hemisphere defined, respectively, above and below said axis,
   said housing structure further having emergency diaphragm means and service diaphragm means mounted therein for independent movement between brake-applying and brake-releasing positions;
   said emergency diaphragm means defining with said housing structure a variable volume spring chamber and a variable volume air chamber on opposite sides of said emergency diaphragm means;
   compression spring means in said spring chamber resiliently biasing said emergency diaphragm means into its brake-applying position wherein said spring chamber is of maximum volume and said air chamber is of minimum volume;

said air chamber being operable to receive air under pressure therein sufficient to move said emergency diaphragm means from its brake-applying position into its brake-releasing position wherein said spring means is compressed and said spring chamber is of minimum volume and said air chamber is of maximum volume;

said service diaphragm means defining with said housing structure a variable volume control chamber on one side of said service diaphragm means;

said control chamber being operable (1) to have air under pressure introduced therein to move said service diaphragm means from its brake-releasing position into its brake-applying position, and (2) to have air under pressure discharged therefrom to allow said service diaphragm mans to move from its brake-applying position into its brake-releasing position;

brake-applying means movable (1) in response to the introduction and discharge of air under pressure into and out of said control chamber and the resultant movements of said service diaphragm means when said air chamber is filled with air under pressure and said emergency diaphragm means is retained thereby in its brake-releasing position and (2) in response to the movement of said emergency diaphragm means under the bias of said spring means into its brake-applying position when air pressure is discharged from both the air chamber and control chamber;

mounting means attached to said housing structure for orienting said actuator in said wheeled vehicle in more than one position;

a plurality of air flow opening means extending through said housing structure defining said variable volume spring chamber for maintaining said spring chamber at atmospheric pressure, said openings being arranged such that, regardless of how said brake actuator is oriented, at least one of said plurality of opening means will be located in the upper hemisphere of said spring chamber housing and another of said opening means will be located in the lower hemisphere of said spring chamber housing;

flow restrictive plug means adapted to be inserted into any of said air flow opening means so that, regardless of the orientation of the actuator, the opening means arranged in the upper hemisphere of said spring chamber housing can be plugged to minimize the likelihood that contaminants will enter said spring chamber when said emergency diaphragm means is moved into its brake-applying position and when said emergency actuator is not in use.

2. The brake actuator as set forth in claim 1 wherein said opening means are located at an axially intermediate portion of said spring chamber housing.

3. The brake actuator as set forth in claim 1 or 2, wherein said opening means are located in said upper and lower hemispheres of said spring chamber housing such that, when the actuator is mounted in said wheeled vehicle, said openings will be diametrically opposed in the uppermost and lowermost hemispheric portions of said spring chamber housing.

4. The brake actuator as set forth in claim 3, wherein said flow restrictive plug means is made from a flexible material such as rubber.

5. The brake actuator as set forth in claim 2, wherein said opening means are located in said upper and lower hemispheres of said spring chamber housing such that, when the actuator is mounted in said wheeled vehicle, said openings will be diametrically opposed in the uppermost and lowermost hemispheric portions of said spring chamber housing.

6. The brake actuator as set forth in claim 5, wherein said flow restrictive plug means is made from a flexible material such as rubber.

* * * * *